March 8, 1932.  G. W. PACKER  1,848,140

TROLLEY POLE SOCKET

Filed April 21, 1930

Inventor
Glenn W. Packer
Clarence F. Poole
Attorney

Patented Mar. 8, 1932

1,848,140

UNITED STATES PATENT OFFICE

GLENN W. PACKER, OF CHICAGO, ILLINOIS, ASSIGNOR TO GOODMAN MANUFACTURING COMPANY, OF CHICAGO, ILLINOIS, A CORPORATION OF ILLINOIS

TROLLEY POLE SOCKET

Application filed April 21, 1930. Serial No. 445,887.

This invention relates to improvements in trolley pole sockets and has among other objects to provide a new and improved adjustable trolley pole socket for reel and trolley gathering locomotives operable in thin seams of coal.

Formerly trolley poles used on mine locomotives have been supported for pivotal movement about a vertical axis with the base of the trolley pole on a level with the top of the locomotive so that the trolley pole may be completely reversed if desired. A trolley pole so supported projects above the deck of the locomotive when the pole is in an inoperative position and the locomotive is moving in low sections of the mine on power obtained from the cable reel. The device of my invention provides a trolley pole socket which supports the trolley pole so that the base thereof is on a level with the top deck of the locomotive when the trolley pole is in an operative position, and lowers the entire trolley pole below the deck of the locomotive when the trolley pole is in an inoperative position and the locomotive is traveling in low parts of the mine on power obtained from the cable reel.

My invention may be more clearly understood with reference to the accompanying drawings wherein.

Like numerals refer to like parts throughout the various figures.

Figure 1:
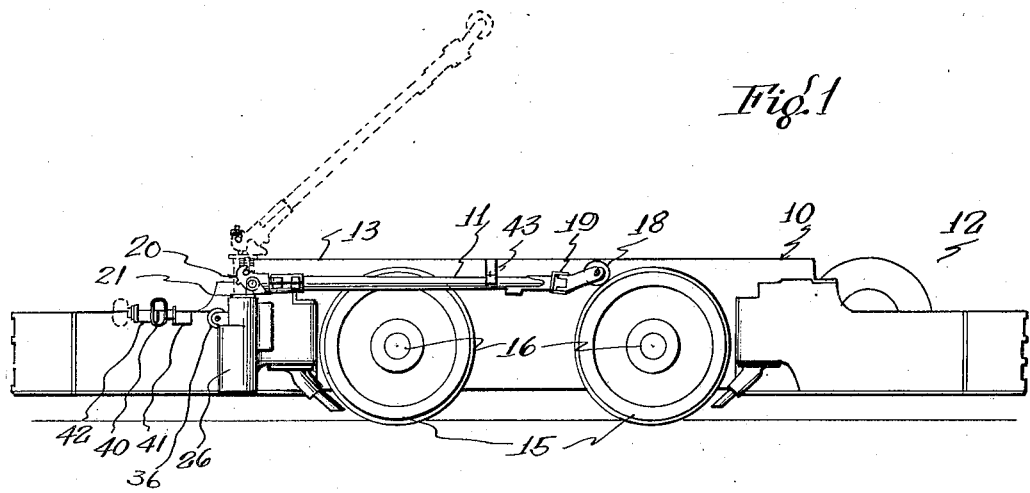
Figure 1 is a side elevation of a locomotive embodying the device of my invention.
Figure 2:
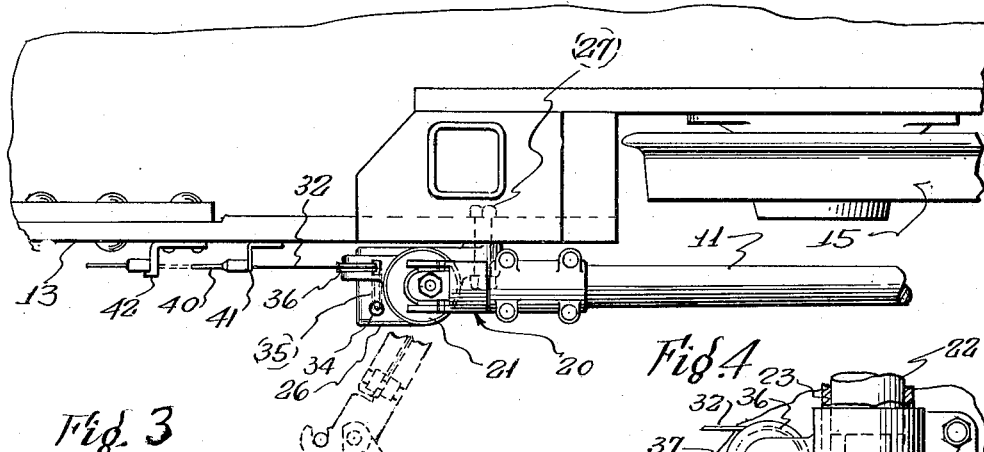
Figure 2 is an enlarged top plan fragmentary view of a locomotive showing the trolley in an inoperative position.

Referring now in detail to the drawings, the invention is herein preferably shown as being embodied in a low vein locomotive 10 of the gathering type, having a trolley pole 11 for supplying the locomotive with power when traveling along the portion of the mine provided with a trolley line, and a cable reel 12 for supplying the locomotive with power when beyond the trolley line in the usual manner. The locomotive 10 is of an ordinary type having a frame 13 supported on wheels 15 and axles 16 driven by suitable electric motors in a usual manner (not shown).

The trolley pole 11 includes a trolley wheel 18 supported on a trolley harp 19 adaptable to engage a trolley wire, and a trolley pole support generally indicated at 20 for supporting the trolley pole for angular movement about a horizontal axis.

The trolley pole support 20 is of a usual construction and is no part of my present invention so will only be described in so far as is necessary to fully disclose my present invention and has a base 21 supported on a lower cylindrical portion 22 which fits within a socket 23 and is movable with respect thereto about a vertical axis. The cylindrical portion 22 of the trolley pole support has a shaft 24 depending therefrom which shaft has a reduced end 25 which fits in a bored aperture in the lower portion of the socket 23 to aid in holding the trolley pole support 20 within said socket. Suitable tension means are provided within the cylindrical portion 22 of the trolley pole support 20 to hold the trolley wheel 18 in engagement with the trolley wire in a manner well known to the art which is not herein shown since it is no part of my present invention.

Referring now in particular to the novel features of my invention, which include a means for vertically moving the socket 23 and trolley pole 11; a support member 26 is provided for the socket 23. The support member 26 is held to the locomotive frame 13 near the control end thereof by means of nuts and bolts 27 in a usual manner, and has a cylindrical guide 28 formed therein which receives the socket 23 and forms a guiding support for said socket as it is vertically moved therein. A vertically extending guide groove 30 is formed in the cylindrical guide 28 and is adaptable to receive a stud 31 integral with the socket 23 to prevent turning of said socket within said support.

Flexible means are provided for vertically moving the socket 23 within the cylindrical guide 28 which means herein comprises a cable 32 having one end fixed in the support member 26. Any well known means may be used to hold the cable 32 to the support member 26, but as herein shown a threaded clamping member 33 is fixed on the end of the cable 32, and a nut 34 is threaded on the end of said clamping member, and abuts the outer side of said support member. The cable 32 extends downwardly from the clamping member 33 around a pulley 35 journaled on the stud 31 to rotate about an axis parallel to the longitudinal axis of the locomotive. From thence the cable 32 extends upwardly over a pulley 36 supported in the support member 26 on a shaft 37 near the upper end thereof to rotate about an axis extending transversely of the locomotive frame. The cable 32 then extends forwardly along the locomotive frame 13 to a point where it may be conveniently reached by the locomotive operator. A hand grip 40 is provided on the forward end of the cable 32 and stops 41 and 42 are fixed to the locomotive frame to engage the hand grip 40 and hold the trolley pole socket 23 in an elevated operative position or allow said trolley pole to rest in a lowered inoperative position.

Figure 3:
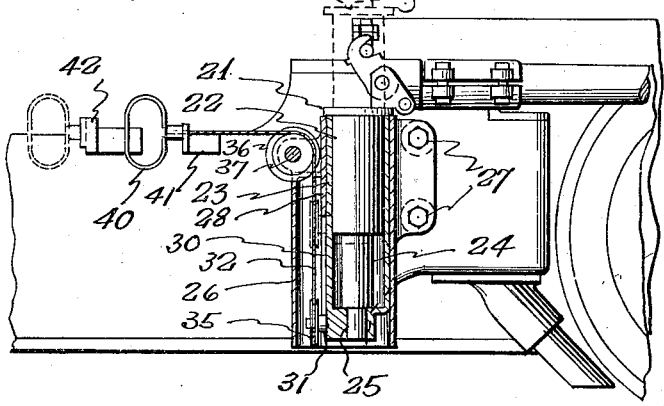
Figure 3 is an enlarged detail view of the trolley pole socket with parts in section to more clearly show the details of my invention.
Figure 4:
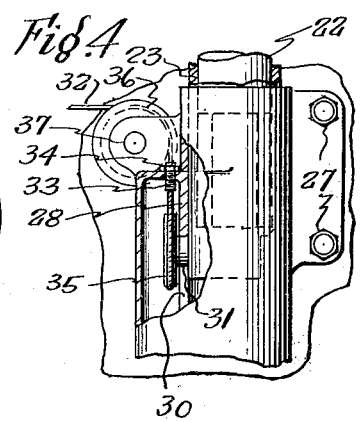
Figure 4 is an enlarged fragmentary detail view of the trolley pole socket in a different position than is shown in Figure 3 and with different parts broken away and in section.

In Figures 1 and 3 it may be seen that when the hand grip 40 is engaged by the stop 42 that the socket 23 is in an elevated position and that the base 21 of the trolley pole support 20 is on a level with the top deck of the locomotive so the trolley wheel 18 may engage the trolley wire and so that the trolley pole 11 may be moved about both a vertical and horizontal axis to enable the trolley wheel to follow the wire when the locomotive is traveling on an irregular track around sharp turns as well as when on a straight track. It may also be seen that when the hand grip 40 is engaged by the stop 41 that the trolley pole support 20 is below the deck of the locomotive, and that when the trolley pole 11 is in a substantially horizontal position, and engaged by a hook 43 to hold it in such a position, that the entire trolley mechanism is below the top deck of the locomotive, thus allowing the locomotive to travel into low rooms or entries on power obtained from the cable reel 12.

It may thus be seen that an adjustable socket for a low vein combination cable reel and trolley locomotive has been provided which supports the trolley in an elevated position when in operation to allow a maximum horizontal and vertical movement of said trolley pole and in a lowered position below the deck of the locomotive when inoperative, which allows the locomotive to travel in coal of minimum thickness when operated on the gathering reel.

Although I have shown and described one form in which my invention may be embodied, it will be understood that the arrangement of the various parts and the construction thereof may be altered or changed without departing from the spirit or scope thereof. Furthermore, I do not wish to be construed as limiting myself to the specific embodiment illustrated, excepting as it may be limited by the appended claims.

I claim as my invention:

1. In combination with a trolley pole, a support having guide walls therein, a socket guided in said guide walls, a guide groove within said walls, a stud having connection with said socket and guided by said guide groove, a pulley on said stud, and a flexible member having connection with said pulley intermediate its ends for vertically moving said socket within said guide walls.

2. In combination with a trolley pole, a support having guide walls therein, a socket guided in said guide walls, a guide groove within said walls, a stud having connection with said socket and guided by said guide groove, a pulley on said stud, another pulley on said support, and a flexible member having fixed connection with said support at one of its ends and having connection with said first and second mentioned pulleys intermediate its ends for vertically moving said socket within said guide walls to raise or lower said trolley pole upon actuation of said flexible member.

3. In combination with a trolley pole, a support, a trolley pole socket vertically movable with respect to said support, means for guiding said socket within said support to prevent turning of said socket within said support and means for vertically moving said socket within said support comprising a flexible cable having operative engagement with said socket intermediate its ends.

4. In combination with a trolley pole, a support, a trolley pole socket vertically movable with respect to said support, a stud having connection with said socket and engagement with said support for guiding said socket within said support to prevent turning of said socket within said support and means for vertically moving said socket within said support comprising a flexible cable having operative connection with said stud intermediate its ends.

5. In combination with a trolley pole, a support, a trolley pole socket vertically movable with respect to said support, a stud having connection with said socket and engagement with said support for guiding said socket within said support to prevent turning of said socket within said support and means for vertically moving said socket within said support comprising a pulley supported on the outer end of said stud and a flexible cable having operative engagement with said pulley intermediate its ends.

6. In combination with a mine locomotive, a trolley pole having a base, means for supporting the base of said trolley pole on a level with the deck of said locomotive when operative and below the deck of said locomotive when inoperative comprising a support, a trolley pole socket, flexible means for vertically moving said socket within said support and means for guiding said socket within said support to prevent turning of said socket within said support comprising a stud having connection with said socket and slidable engagement with said support.

7. In combination with a mine locomotive, a trolley pole having a base, means for supporting the base of said trolley pole on a level with the deck of said locomotive when operative and below the deck of said locomotive when inoperative comprising a support, a trolley pole socket, flexible means for vertically moving said socket within said support and means for guiding said socket within said support to prevent turning of said socket within said support comprising a vertically extending guide groove within said support and a stud having connection with said socket and slidable engagement with said guide groove.

8. In combination with a mine locomotive, a trolley pole having a base, means for supporting the base of said trolley pole on a level with the deck of said locomotive when operative and below the deck of said locomotive when inoperative comprising a support, a trolley pole socket vertically movable within said support, a vertically extending guide groove within said support, a stud having connection with said socket and slidable engagement with said guide groove and a flexible member having engagement with said stud intermediate its ends for vertically moving said socket within said support.

9. In combination with a mine locomotive, a trolley pole having a base, means for supporting the base of said trolley pole on a level with the deck of said locomotive when operative and below the deck of said locomotive when inoperative comprising a support, a trolley pole socket vertically movable within said support, a vertically extending guide groove within said support, a stud having connection with said socket and slidable engagement with said guide groove, a pulley on the outer end of said stud and a flexible cable having operative engagement with said pulley intermediate its ends for vertically moving said socket within said support.

Signed at Chicago, in the county of Cook and State of Illinois, this 19th day of April, 1930.

GLENN W. PACKER.